United States Patent
Hwang et al.

(10) Patent No.: US 10,546,663 B2
(45) Date of Patent: Jan. 28, 2020

(54) ELECTRICAL CONDUCTORS, PRODUCTION METHODS THEREOF, AND ELECTRONIC DEVICES INCLUDING THE SAME

(71) Applicant: SAMSUNG ELECTRONICS CO., LTD, Suwon-si, Gyeonggi-do (KR)

(72) Inventors: Sungwoo Hwang, Suwon-si (KR); Se Yun Kim, Seoul (KR); Jong Wook Roh, Anyang-si (KR); Woojin Lee, Suwon-si (KR); Jongmin Lee, Hwaseong-si (KR); Doh Won Jung, Seoul (KR); Chan Kwak, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 357 days.

(21) Appl. No.: 15/296,261

(22) Filed: Oct. 18, 2016

(65) Prior Publication Data

US 2017/0110213 A1 Apr. 20, 2017

(30) Foreign Application Priority Data

Oct. 19, 2015 (KR) .................. 10-2015-0145636

(51) Int. Cl.
*H01B 1/08* (2006.01)
*G06F 3/041* (2006.01)

(52) U.S. Cl.
CPC .............. *H01B 1/08* (2013.01); *G06F 3/041* (2013.01); *G06F 2203/04102* (2013.01)

(58) Field of Classification Search
CPC .. G06F 3/041; G06F 2203/04102; H01B 1/08
See application file for complete search history.

(56) References Cited

U.S. PATENT DOCUMENTS

| 7,514,065 | B2 | 4/2009 | Takasu et al. | |
|---|---|---|---|---|
| 8,487,344 | B2 | 7/2013 | Seong | |
| 8,628,695 | B2 | 1/2014 | Hang et al. | |
| 2008/0258174 | A1* | 10/2008 | Seong | H01B 1/08 257/184 |
| 2010/0089745 | A1 | 4/2010 | Valdez et al. | |
| 2014/0212672 | A1 | 7/2014 | Han et al. | |
| 2014/0349085 | A1* | 11/2014 | Jeon | B01D 67/0039 428/195.1 |
| 2017/0094723 | A1* | 3/2017 | Kim | B22F 1/0025 |

FOREIGN PATENT DOCUMENTS

| CN | 1533986 A | 10/2004 |
|---|---|---|
| CN | 101331620 A | 12/2008 |
| EP | 1463071 A2 | 9/2004 |
| JP | 2004-315347 A | 11/2004 |
| JP | 2008-174431 A | 7/2008 |
| JP | 2015-060217 A | 3/2015 |
| WO | 2007069871 A1 | 6/2007 |

OTHER PUBLICATIONS

European Search Report for European Patent Application No. 16194586.0 dated Feb. 23, 2017.
Liao et al., "An oxygen cathode with stable full discharge-charge capability based on 2D conducting oxide*", Energy & Environmental Science, 8, 2015, 1992-1997.
Wang et al., "All-Nanosheet Ultrathin Capacitors Assembled Layer-by-Layer via Solution-Based Processes", ACSNANO, vol. 8., No. 3., 2014, pp. 2658-2666.
Office Action dated Mar. 25, 2019, of the corresponding Chinese Patent Application No. 201610911911.9.

* cited by examiner

*Primary Examiner* — Cheng Yuan Huang
(74) *Attorney, Agent, or Firm* — Cantor Colburn LLP

(57) ABSTRACT

An electrical conductor includes: a first conductive layer including a plurality of ruthenium oxide nanosheets, wherein at least one ruthenium oxide nanosheet of the plurality of ruthenium oxide nanosheets includes a halogen, a chalcogen, a Group 15 element, or a combination thereof on a surface of the ruthenium oxide nanosheet.

19 Claims, 12 Drawing Sheets

FIG. 3

| | |
|---|---|
| Window | ~60 |
| Second optically clear adhesive layer | ~50 |
| Second transparent electrically conductive film | ~40 |
| First optically clear adhesive layer | ~30 |
| First transparent electrically conductive film | ~20 |
| Display panel | ~10 |

ELECTRICAL CONDUCTORS, PRODUCTION METHODS THEREOF, AND ELECTRONIC DEVICES INCLUDING THE SAME

CROSS-REFERENCE TO RELATED APPLICATION

This application claims priority to and the benefit of Korean Patent Application No. 10-2015-0145636, filed in the Korean Intellectual Property Office on Oct. 19, 2015, and all the benefits accruing therefrom under 35 U.S.C. § 119, the entire content of which is incorporated herein by reference.

BACKGROUND

1. Field

An electrical conductor, a method of producing the electrical conductor, and a device including the same are disclosed.

2. Description of the Related Art

An electronic device, such as a flat panel display, a liquid crystal display (LCD), a light emitting diode (LED) display, a touch screen panel, a solar cell, a transparent transistor, and the like, may include an electrically conductive thin film such as a transparent electrically conductive thin film. It is desirable for a material of an electrically conductive film to have high light transmittance (e.g., greater than or equal to about 80 percent (%) in a visible light region) and low specific resistance (e.g., less than or equal to about $1 \times 10^{-4}$ ohm·centimeter ($\Omega$·cm)). Currently available materials used in transparent electrically conductive thin films include indium tin oxide (ITO), tin oxide ($SnO_2$), zinc oxide (ZnO), and the like. ITO is a transparent electrode material and is a transparent semiconductor having a wide bandgap of 3.75 electron volts (eV), and may be used to manufacture conductive films having a large surface area using a sputtering process. However, in terms of application to a flexible touch panel or a UD-grade high resolution display, ITO has poor flexibility and will inevitably cost more due to limited reserves of indium. Therefore, development of an alternative material is desired.

Recently, a flexible electronic device, e.g., a foldable or bendable electronic device, has been drawing attention as a next generation electronic device. Therefore, there is a need for a material having improved transparency, relatively high electrical conductivity, and suitable flexibility, as a transparent electrode material.

SUMMARY

An embodiment provides a flexible electrical conductor having improved conductivity and improved light transmittance.

Another embodiment provides a method of producing the electrical conductor.

Yet another embodiment provides an electronic device including the electrical conductor.

In an embodiment, an electrical conductor includes: a first conductive layer including a plurality of ruthenium oxide nanosheets, wherein at least one ruthenium oxide nanosheet of the plurality of ruthenium oxide nanosheets is surface-doped with any of a halogen, a chalcogen, a Group 15 element, and a combination thereof.

The halogen may be selected from F, Cl, Br, I, and a combination thereof.

The chalcogen may be selected from S, Se, Te, and a combination thereof.

The Group 15 element may be selected from N, P, As, and a combination thereof.

The halogen, the chalcogen, and the Group 15 element may be present as an ionic species, a surface-bound reactive group, an oxyhalide, an oxy chalcogenide, or a combination thereof.

The electrical conductor may include a second conductive layer that is disposed on a first surface of the first conductive layer and includes a plurality of conductive metal nanowires.

The plurality of conductive metal nanowire may include silver (Ag), copper (Cu), gold (Au), aluminum (Al), cobalt (Co), palladium (Pd), or a combination thereof.

The plurality of conductive metal nanowires may have an average diameter of less than or equal to about 50 nanometers (nm) and an average length of greater than or equal to about 1 micrometer (um).

The electrical conductor may be a transparent conductive film.

The plurality of ruthenium oxide nanosheets may have an average lateral size of greater than or equal to about 0.1 micrometer ($\mu$m) and less than or equal to about 100 $\mu$m.

The ruthenium oxide nanosheets may have a thickness of less than or equal to about 3 nanometers (nm).

The first conductive layer may be a discontinuous layer including an open space disposed between neighboring ruthenium oxide nanosheets of at least two ruthenium oxide nanosheets of the plurality of ruthenium oxide nanosheets, and an area of the open space may be less than or equal to about 50% of a total area of the first conductive layer.

The electrical conductor may have transmittance of greater than or equal to about 85% with respect to light having a wavelength of 550 nm or with respect to visible light having a wavelength of about 400 nm to 700 nm (for example, when the first and/or conductive layer(s) have a thickness of 100 nm or less, e.g., less than or equal to about 90 nm, less than or equal to about 80 nm, less than or equal to about 70 nm, less than or equal to about 60 nm, or less than or equal to about 50 nm).

The electrical conductor may have sheet resistance of less than or equal to about $1.2 \times 10^4$ ohms per square ($\Omega$/sq), for example, less than or equal to about $1 \times 10^4$ ohms per square.

At least one of the first conductive layer and the second conductive layer may further include a binder.

The electrical conductor may further include an overcoating layer including a thermosetting resin, an ultraviolet light-curable resin, or a combination thereof, and wherein the overcoating layer is disposed on at least one of the first conductive layer and the second conductive layer.

The electrical conductor may further include a transparent substrate disposed on an opposite second surface of the first conductive layer.

In some embodiments, a method of producing the electrical conductor includes: heat-treating a mixture of a ruthenium oxide and an alkali metal compound to prepare an alkali metal-substituted layered ruthenium oxide; treating the alkali metal-substituted layered ruthenium oxide with an acidic solution to prepare a proton exchanged layered ruthenium oxide, wherein at least a portion of the alkali metal is replaced with a proton;

contacting the proton exchanged layered ruthenium oxide with a C1 to C20 (e.g., C1 to C16) alkyl ammonium compound to prepare a C1 to C20 (e.g., C1 to C16) alkyl ammonium-layered ruthenium oxide; and mixing the C1 to C20 (e.g., C1 to C16) alkyl ammonium-layered ruthenium oxide with a solvent to obtain an exfoliated ruthenium oxide nanosheet, wherein the method further includes conducting a surface doping to obtain a plurality of surface-doped ruthenium oxide nanosheets, and wherein the surface doping comprises adding the alkali metal-substituted layered ruthenium oxide, the proton exchanged layered ruthenium oxide, or the exfoliated ruthenium oxide nanosheet to an aqueous solution including a ruthenium halide, a ruthenium chalcogenide, an alkali metal halide, an ammonium halide, or a ruthenium-Group 15 element compound to form a mixture, and heating the mixture at a temperature of greater than or equal to about 100° C.

The surface doping is conducted with respect to the alkali metal substituted layered ruthenium oxide, and the method may further include drying a surface-doped product.

The surface doping is conducted with respect to the exfoliated ruthenium oxide nanosheets, and the method may further include dispersing a surface-doped product in a mixture of a solvent and a C1 to C20 (e.g., C1 to C16) alkyl ammonium compound to prepare a re-exfoliated ruthenium oxide nanosheet.

In another embodiment, an electronic device including the electrical conductor is provided.

The electronic device may be a flat panel display, a touch screen panel, a solar cell, an e-window, an electrochromic mirror, a heat mirror, a transparent transistor, or a flexible display.

According to an embodiment, a surface of a ruthenium oxide nanosheet is thermochemically doped with a halogen, a chalcogen, or a Group 15 element to enhance an electrical conductivity thereof. When the aforementioned element is doped on the ruthenium oxide nanosheet via a surface reaction, the nanosheets may provide increased electrical conductivity and enhanced light transmittance and thereby may be used in a flexible or foldable display electrode material.

BRIEF DESCRIPTION OF THE DRAWINGS

The above and other advantages and features of this disclosure will become more apparent by describing in further detail exemplary embodiments thereof with reference to the accompanying drawings, in which:

FIG. 3 is a schematic cross-sectional view of a touch screen panel for an electronic device, according to an embodiment;

DETAILED DESCRIPTION

Figure 1A:
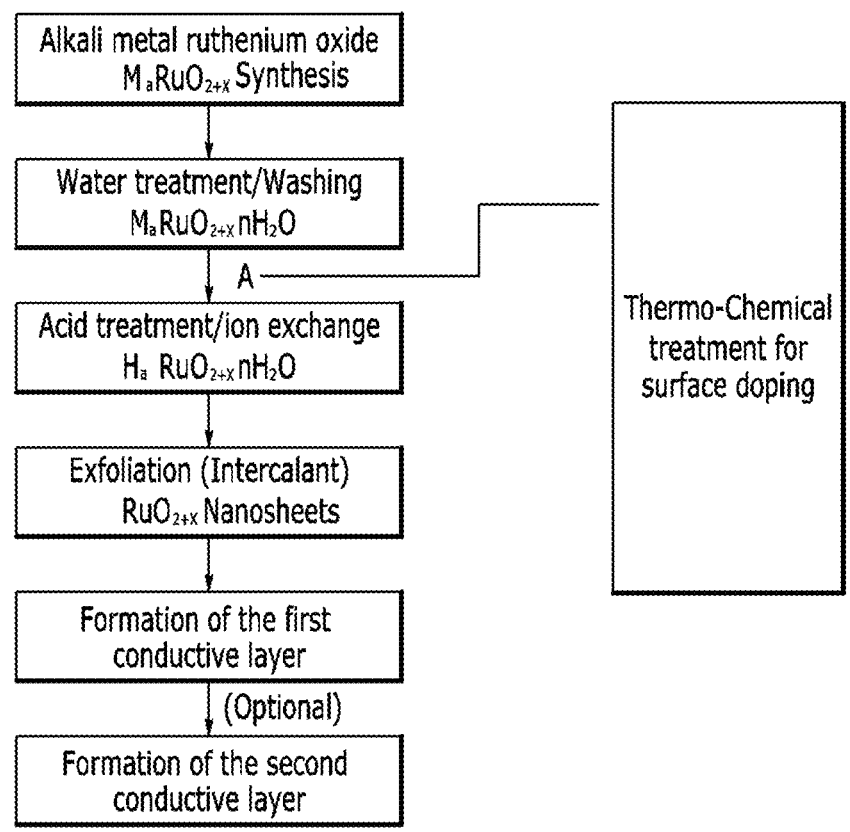
FIG. 1A is a schematic illustration of a process for the production of an electrical conductor, in accordance with an embodiment.

Advantages and characteristics of this disclosure, and a method for achieving the same, will become evident by referring to the following exemplary embodiments together with the drawings attached hereto. However, this disclosure may be embodied in many different forms and is not to be construed as limited to the embodiments set forth herein. If not defined otherwise, all terms (including technical and scientific terms) in the specification may be defined as those commonly understood by one skilled in the art. The terms defined in a dictionary are not to be interpreted ideally or exaggeratedly unless clearly defined otherwise. In addition, unless explicitly described to the contrary, the word "comprise" and variations such as "comprises" or "comprising" will be understood to imply the inclusion of stated elements but not the exclusion of any other elements.

Further, the singular includes the plural unless mentioned otherwise.

In the drawings, the thickness of layers, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, the phrase "a first element is disposed on a second element" means that the first element is adjacent to (e.g., is in contact with) the second element and the upper and lower position therebetween is not limited.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting to "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within±10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "sheet resistance" refers to a value determined by a 4-point probe method for a specimen having a predetermined size (e.g., 210 mm×297 mm).

As used herein, a transmittance of a material is the value excluding light absorption of a substrate. As used herein, the transmittance may refer to a transmittance with respect to visible light having a wavelength of about 400 nm to 800 nm or with respect to light having a wavelength of about 550 nm.

As used herein, the term "ionic species" refers to an element which is present in an ionized form. For example, in the case of a halogen or a chalcogen (e.g., a Group 16 element), the ionic species may be $F^-$, $Cl^-$ $Br^-$, $I^-$, $Se^{2-}$, $S^{2-}$, $Te^{2-}$, and the like. The ionic species may be bound to an oxygen atom or to a ruthenium atom on a surface of the nanosheet.

As used herein, the term "surface bound reactive group" refers to an ionic species that forms a bond with an oxygen atom or with a ruthenium atom on the surface of the nanosheet.

As used herein, the term "surface doping" or "surface-doped" refers to a material in which a doping element, such as a halogen, a chalcogen, or a Group 15 element, forms a chemical or physical bond, such as a covalent bond, an ionic bond, a hydrogen bond, a van der Waals bond, or the like, with an oxide (e.g., an oxygen atom or a ruthenium atom) on a surface of the nanosheet and such that the doping element is not separated from the surface of the nanosheet via physical manipulation, such as dispersing or agitation in water or a water miscible solvent (e.g., alcohol and the like). For example, the surface-doped ruthenium oxide nanosheet may include the doping element on a surface thereof.

In an embodiment, an electrical conductor includes a first conductive layer including a plurality of ruthenium oxide nanosheets. In the electrical conductor, at least two of ruthenium oxide nanosheets are in contact with one another to provide an electrical connection (e.g., electrical conduction path). As used herein, "the nanosheets being in contact with one another to provide an electrical connection (e.g., the electrically conduction path)" refers to the case where the contact between the nanosheets is made to provide an electrical conduction path, and thereby the conductive layer has an electrical conductivity (for example, of a sheet resistance of less than or equal to about 1,000,000 ohm/sq.). At least one of the ruthenium oxide nanosheet is surface-doped with a halogen, a chalcogen, a Group 15 element, or a combination thereof.

The ruthenium oxide may form a nanosheet when it is exfoliated by intercalation. The ruthenium oxide nanosheet thus prepared may be used in an electrical conductor (e.g., to provide a transparent electrode material). As used herein, the term "ruthenium oxide" refers to a material represented by the formula $RuO_{2+x}$, wherein x is 0 to 0.5.

Figure 1B:
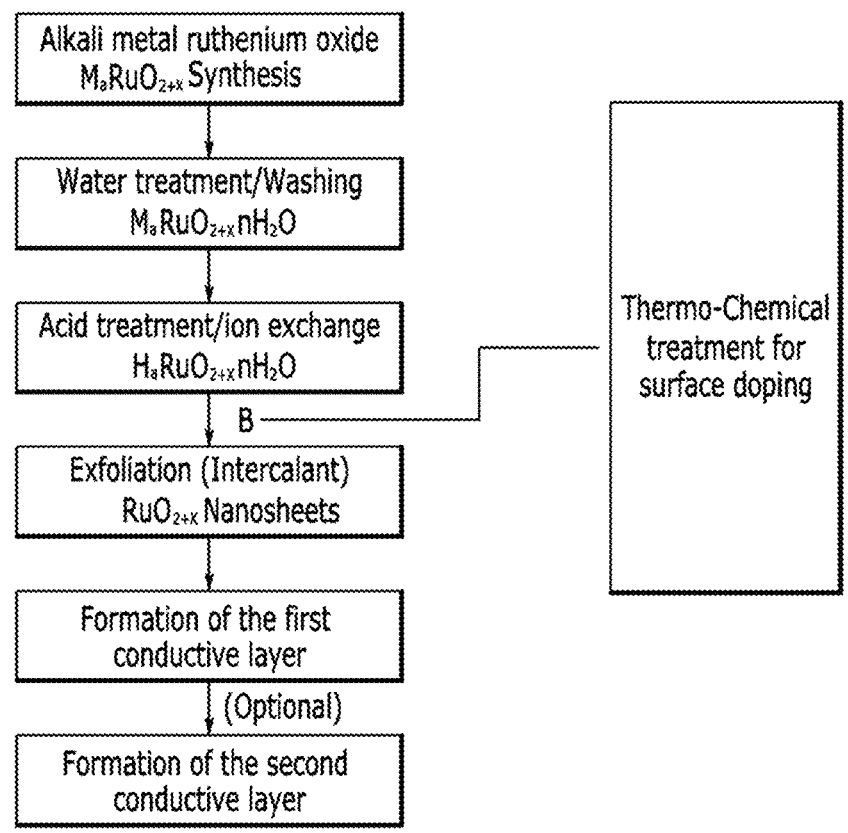
FIG. 1B is a schematic illustration of a process for the production of an electrical conductor, in accordance with another embodiment.
Figure 1C:
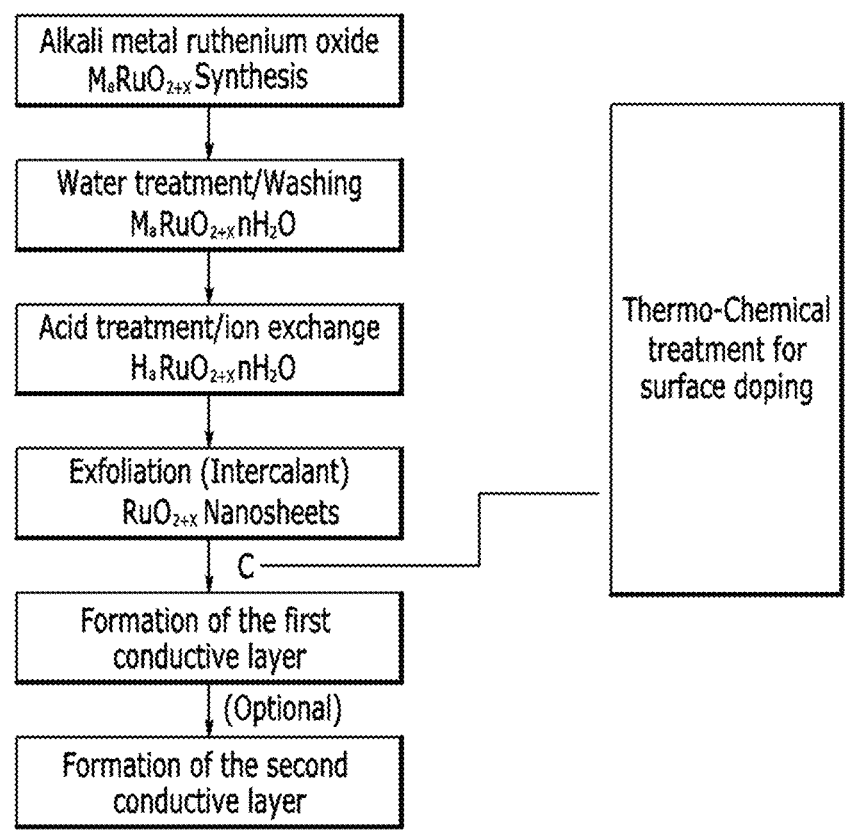
FIG. 1C is a schematic illustration of a process for the production of an electrical conductor, in accordance with still another embodiment.

The ruthenium oxide nanosheet may be prepared by any suitable method. Referring to FIGS. 1A to 1C, a bulk material for producing a ruthenium oxide nanosheet may be prepared from an alkali metal ruthenium oxide (e.g., an alkaline metal ruthenium oxide of the formula $MRuO_2$, wherein M is Na, K, Rb, or Cs), which has a layered structure (for example a structure of the formula M-$RuO_2$-M-$RuO_2$-M for the alkali metal ruthenium oxide). The alkali metal ruthenium oxide may be obtained by mixing an alkali metal compound with ruthenium oxide and calcining or melting the obtained mixture at an appropriate temperature, for example at about 500° C. to about 1000° C., for at least about 1 hour (h) or longer, (e.g., for at least about 6 h). The alkali metal ruthenium oxide is then washed with water to obtain a hydrate of the alkali metal ruthenium oxide (e.g., $M_aRuO_{2+x} \cdot nH_2O$, wherein a is 0 to about 0.3, x is 0 to about 0.5, and n is a number that denotes the hydration state, and is not particularly limited and for example, may be about 0.1 to about 0.9).

When the obtained hydrate of the alkali metal ruthenium oxide is treated with an acid solution, at least a portion of the alkali metal undergoes a proton-exchange to provide a proton-type alkali metal ruthenate hydrate (e.g., having a formula $H_aRuO_{2+x} \cdot nH_2O$, where x=0 to about 0.5, and a is 0 to about 0.3, when all the alkali metal undergoes a proton-exchange).

The obtained proton-exchanged alkali metal ruthenate hydrate may be contacted with a C1 to C20 (e.g., C1 to C16) alkyl ammonium or a C1 to C20 (e.g., C1 to C16) alkylamine to prepare a C1 to C20 (e.g., C1 to C16) alkyl ammonium- or a C1 to C20 (e.g., C1 to C16) alkylamine-substituted compound, which is then mixed with a solvent to obtain exfoliated ruthenium oxide nanosheets.

The solvent may be a high dielectric constant solvent. For example, the solvent may include water, alcohol, acetonitrile, dimethyl sulfoxide, dimethyl formamide, propylene carbonate, or a combination thereof.

For example, during the protonation of $Na_aRuO_{2+x}$, $Na_aRuO_{2+x}$ and an acid compound (e.g., HCl) react with one another, and thereby $Na^+$ is substituted with $H^+$ to prepare a protonated layered ruthenium oxide (e.g., $H_aRuO_{2+x}$). Subsequently, the $H_aRuO_{2+x}$ may be reacted with an alkyl ammonium salt intercalant (e.g., tetraalkyl ammonium hydroxide), so that $H^+$ may be replaced with an alkyl ammonium (e.g., tetrabutylammonium, $TBA^+$). The alkyl ammonium salt may be a C1 to C20 alkyl ammonium salt. Without being limited by theory, it is believed that the intercalant (e.g., $TBA^+$) has such a large size that when it is interposed between the $H_aRuO_{2+x}$ layers, an interlayer distance between the individual layers is increased and this may cause an interlayer separation. Thus, adding the resulting product into a solvent and agitating the same may bring forth exfoliation to provide $RuO_{2+x}$ nanosheets.

In an embodiment, the exfoliation of the alkali metal ruthenium oxide may be carried out using at least two types of intercalating compounds having different sizes. For example, in some embodiments, the protonated alkali metal ruthenium oxide may be treated with a first intercalant having a small size and a second intercalant having a large size. Examples of the at least two intercalant compounds having different sizes may include a tetramethylammonium compound (e.g., tetramethylammonium hydroxide), a tetraethylammonium compound (e.g., tetraethylammonium hydroxide), a tetrapropylammonium compound (e.g., tetrapropylammonium hydroxide), a benzyl trialkyl ammonium compound (e.g., benzyl trimethylammonium hydroxide), a tetrabutylammonium compound (e.g., tetrabutylammonium hydroxide), or a combination thereof, but it is not limited thereto. Examples of the first intercalant having a small size may include tetramethylammonium hydroxide, tetraethylammonium hydroxide, or a combination thereof. Examples of the second intercalant having a large size may include tetrabutylammonium hydroxide, benzyl trimethylammonium hydroxide, or a combination thereof.

The ruthenium oxide nanosheets thus obtained do not have a suitable sheet resistance. For example, the sheet resistance of the ruthenium oxide nanosheet is about 23,000 ohm/sq., as calculated by a computational simulation. Therefore, it is desirable to enhance the conductivity of the ruthenium oxide nanosheets for the improvement of the electrical conductor including the ruthenium oxide nanosheet.

In some embodiments, the ruthenium oxide nanosheet is surface-doped with a doping element including a halogen, a chalcogen, a Group 15 element, or a combination thereof, so that the ruthenium oxide nanosheet may provide enhanced electrical conductivity and thereby provide a decreased level of sheet resistance. The surface doping may be carried out by allowing the doping element to react with a surface of the nanosheet via a thermochemical treatment (e.g., a hydrothermal treatment). As a result of the thermochemical treatment, a local composition change may occur on the surface of the ruthenium oxide nanosheet without causing any substantial change in the crystal structure of the nanosheet. Therefore, the surface of the ruthenium oxide nanosheet may undergo changes in charge distribution and charge movement, which results in a decreased level of sheet resistance of the nanosheets.

The thermochemical treatment used for the surface doping may be carried out on an intermediate product such as a hydrate of the alkali metal ruthenium oxide (e.g., $M_aRuO_{2+x} \cdot nH_2O$) (see A of FIG. 1A), or a protonated alkali metal ruthenate hydrate (e.g., $H_aRuO_{2+x} \cdot nH_2O$ (0≤x≤0.5)) (see B of FIG. 1B), or on the ruthenium oxide nanosheet (see C of FIG. 1C).

The thermochemical treatment may include hydro-thermally treating the intermediate product or the ruthenium oxide nanosheet in the presence of a compound including the aforementioned doping element (hereinafter, also referred to as a precursor) at a temperature of at least about 100° C.

The precursor may include a ruthenium halide such as $RuCl_3$, $RuF_3$, $RuI_3$, $RuBr_3$, or the like, a ruthenium chalcogenide such as $RuS_2$, $RuSe_2$, $RuTe_2$, or the like, an alkali metal halide such as AF, ACl, ABr, AI (A=Li, Na, K, Rb, Cs), or the like, an ammonium halide $NH_4D$ (D=F, Cl, Br, I), or a ruthenium-Group 15 element compound such as RuN, RuP, RuAs, RuSb, RuBi, or the like.

As a type of the thermochemical reaction, the hydrothermal treatment may be carried out at a predetermined temperature and pressure. The temperature of the hydrothermal treating may be selected appropriately in light of the pressure that the reactor can endure. For example, the temperature may be greater than or equal to about 100° C., greater than or equal to about 110° C., greater than or equal to about 120° C., greater than or equal to about 130° C., greater than or equal to about 140° C., greater than or equal to about 150° C., greater than or equal to about 160° C., or greater than or equal to about 170° C. The temperature may be less than or equal to about 250° C., or less than or equal to about 200° C. The time for the hydrothermal treatment is not particularly limited and may be selected in light of other conditions. For example, the time for the thermochemical treatment (e.g., the hydrothermal treatment) may be greater than or equal to about 30 minutes (min), for example, greater than or equal to about 40 min, greater than or equal to about 50 min, greater than or equal to about 1 h, or greater than or equal to about 24 h, but it is not limited thereto.

In a reaction medium (e.g., water) of the thermochemical treatment (e.g., the hydrothermal treatment), the concentration of the precursor may be controlled appropriately and is not particularly limited. The concentration of the precursor may be greater than or equal to about 0.01 moles per liter (mol/L), but it is not limited thereto. For example, the concentration of the precursor may be less than or equal to about 10 mol/L, but it is not limited thereto.

The pressure of the hydrothermal treatment is not particularly limited and may be selected appropriately based upon the type of the precursor, the reaction medium, the pressure limit of the reactor, and the like. For example, the pressure of the hydrothermal treatment may be greater than or equal to about 1 atmosphere (atm), for example, greater than or equal to about 2 atm, greater than or equal to about 3 atm, greater than or equal to about 4 atm, or greater than or equal to about 10 atm, but it is not limited thereto. For example, the pressure of the hydrothermal treatment may be less than or equal to about 12 atm or less than or equal to about 10 atm, but it is not limited thereto.

As a result of the thermochemical treatment, the halogen, the chalcogen, and/or the Group 15 element (e.g. the doping element) may be surface-doped and thereby be present in the form of an ionic species, a surface-bound reactive group, an oxyhalide, an oxychalcogenide, or a combination thereof. The ruthenium oxide nanosheets surface-doped with one or more of the aforementioned elements may exhibit improved electrical conductivity and thus hold a potential to be utilized in a flexible electrode material for a transparent electrode.

The ruthenium oxide nanosheets may have an average lateral size, e.g., a length or width dimension in an in-plane direction, of greater than or equal to about 0.1 μm, for example, greater than or equal to about 0.5 μm, greater than or equal to about 1 μm, greater than or equal to about 2 μm, greater than or equal to about 3 μm, greater than or equal to about 4 μm, greater than or equal to about 5 μm, or greater than or equal to about 6 μm, or about 0.1 μm to about 100 μm, or about 0.5 μm to about 50 μm. The ruthenium oxide nanosheets may have an average lateral size of less than or equal to about 100 μm, for example less than or equal to about 30 μm, less than or equal to about 20 μm, less than or equal to about 10 μm, less than or equal to about 9 μm, less than or equal to about 8 μm, or less than or equal to about 7 μm. When the lateral size of the nanosheets is about 0.5 μm to about 100 μm, the contact resistance between the nanosheets may be decreased. The average lateral size of the nanosheets may be determined in a Scanning Electron Microscopy analysis wherein a predetermined number (e.g., about 100) of nanosheets are randomly selected and for each of the selected nanosheets, the largest value of a length or width dimension is measured and an average of the measured values is calculated.

The ruthenium oxide nanosheets may have an average thickness of less than or equal to about 3 nm, for example less than or equal to about 2.5 nm, or less than or equal to about 2 nm. The ruthenium oxide nanosheets may have an average thickness of greater than or equal to about 1 nm. When the average thickness of the ruthenium oxide nanosheets is less than or equal to about 3 nm, improved transmittance may be obtained.

In some embodiments, the ruthenium oxide nanosheet may have an electrical conductivity, absorption coefficient, and sheet resistance as set forth in Table 1 when it is surface-doped with the doping element:

TABLE 1

| | Sigma (S/cm*) (conductivity) | Alpha (absorption coefficient) | Rs (Ω/sq.) (sheet resistance) |
|---|---|---|---|
| Cl** | 2.03 × 10⁵ | 1.20 × 10⁵ | 58.8 |

*Siemens per centimeter (S/cm)
**present in an amount of about 8.3 atomic percent (at %) with respect to a total combined amount of Cl and Ru.

Figure 2:
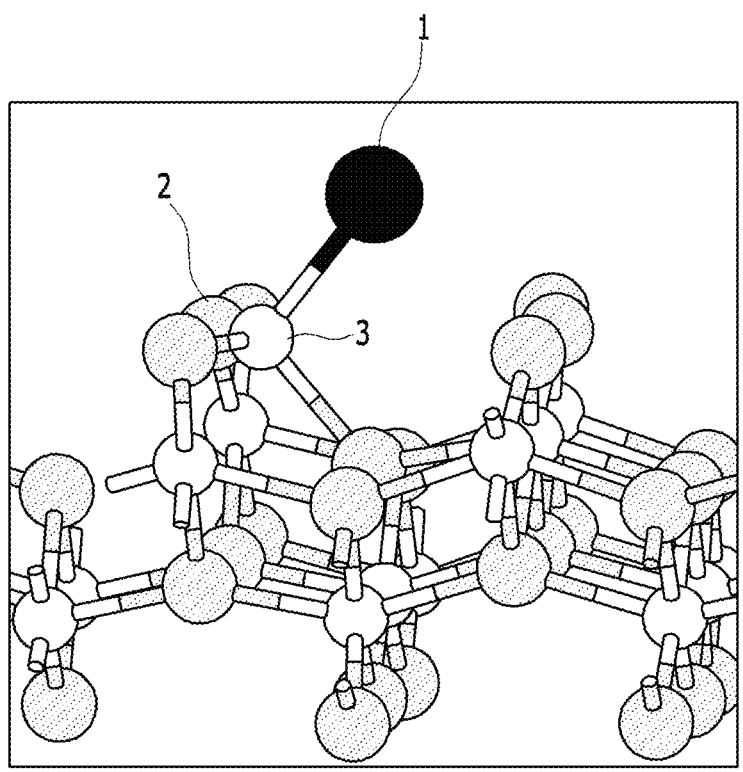
FIG. 2 is a schematic illustration of a structure of a surface-doped ruthenium oxide nanosheet as confirmed by a computer simulation, wherein 1 denotes an halogen atom, a chalcogen atom, or a Group 15 atom, 2 denotes an oxygen atom, and 3 denotes a ruthenium atom.

When the ruthenium oxide nanosheet is surface-doped with the doping element, it may have a structure as schematically illustrated in FIG. 2.

The electrical conductor of the embodiments may include a second conductive layer that is disposed on the first conductive layer and includes a plurality of electrically conductive metal nanowires.

The electrically conductive metal nanowire included in the second conductive layer may comprise silver (Ag), copper (Cu), gold (Au), aluminum (Al), cobalt (Co), palladium (Pd), or a combination thereof (e.g., an alloy thereof or a nanometal wire having two or more segments of different materials). For example, the electrically conductive metal nanowire may include a silver nanowire.

The electrically conductive metal nanowire may have an average diameter of less than or equal to about 50 nanometers (nm), for example less than or equal to about 40 nm, or less than or equal to about 30 nm, or about 1 nm to about 50 nm, or about 5 nm to about 25 nm. The length of the electrically conductive metal nanowire is not particularly limited, and may be appropriately selected considering the diameter. For example, the electrically conductive metal nanowire may have a length of greater than or equal to about 1 micrometer (μm), greater than or equal to about 2 μm, greater than or equal to about 3 μm, greater than or equal to about 4 μm, or greater than or equal to about 5 μm, or about 1 μm to about 100 μm, or about 2 μm to about 50 μm, and is not limited thereto. According to another embodiment, the electrically conductive metal nanowire may have a length of greater than or equal to about 10 μm, for example greater than or equal to about 11 μm, greater than or equal to about 12 μm, greater than or equal to about 13 μm, greater than or equal to about 14 μm, or greater than or equal to about 15 μm. The electrically conductive metal nanowire may be fabricated according to any suitable method and may be a suitable commercially available metal nanowire. The nanowire may include a polymeric coating on a surface thereof, such as a coating including polyvinylpyrrolidone.

Various efforts have been made to develop a flexible transparent electrode material having excellent electrical conductivity and which is transparent in the visible light range. Metals may have high electron density and high electrical conductivity. However, most metals tend to react with oxygen in air to form an oxide on a surface of the metal resulting in a greatly reduced electrical conductivity. Attempts have been made to reduce surface contact resistance using a ceramic material having good conductivity and showing reduced surface oxidation. However, the currently available conductive ceramic materials (such as ITO) suffer from unstable supply of raw materials. Moreover, ceramic materials show minimal electrical conductivity compared to a metal, and also, their flexibility tends to be poor. Since graphene as a layered material is reported to have it desirable electrical conductive properties, much research has been conducted regarding the use of a single atom layer thin film of a layered structure material having weak interlayer bonding force. For example, there have been attempts to use the graphene as a substitute material for the indium tin oxide (ITO) having poor mechanical properties. However, the graphene has a high absorption coefficient and thus is unable to provide a satisfactory level of light transmittance and cannot be used with a thickness of greater than or equal to about 4 layers. Transition metal dichalcogenides having a layered crystal structure may show comparable transmittance when prepared as a thin film, but they have semiconductor properties and thus have insufficient electrical conductivity to be used as an electrically conductive film.

In contrast, the ruthenium oxide nanosheets surface-doped with a doping element, such as the halogen, the chalcogen, and/or the Group 15 element, may provide improved electrical conductivity and enhanced light transmittance, as well as contributing to the flexibility of the prepared electrical conductor, and thus may be used to prepare a flexible electrical conductor, e.g., a flexible transparent conductive film.

The first conductive layer, including the aforementioned ruthenium oxide nanosheets, may include a discontinuous layer including an open space between at least two of the ruthenium oxide nanosheets, and the area of the open space based on the total area of the first conductive layer may be less than or equal to about 50%, for example less than or equal to about 40%, less than or equal to about 30%, less than or equal to about 20%, or less than or equal to about 10%, or about 1% to about 50%, or about 5% to about 40%, based on a total area of the first conductive layer. In order to obtain the area ratio of the open space, for example, a Scanning Electron Microscopic image of the first conductive layer including nanosheets disposed to have an open space is obtained and the area of the open space (i.e., the portion not having the nanosheets in the first conductive layer) is determined and is divided with the total area of the first conductive layer to provide an area ratio. In the electrical conductor, a conductive metal nanowire, e.g., a silver nanowire, may be positioned to extend over the open space of the first conductive layer.

In an embodiment, the first conductive layer is a discontinuous layer comprising spatially separated ruthenium oxide nanosheets of the plurality of ruthenium oxide nanosheets, and the ruthenium oxide nanosheets cover at least about 50%, about 50% to about 99%, about 60% to about 95%, or about 70% to about 90% of a total area of the first conductive layer.

Formation of the first conductive layer and the second conductive layer may be carried out by any suitable method capable of forming a layer, and is not particularly limited.

In some embodiments, the first conductive layer including the ruthenium oxide nanosheets is formed on a substrate and the second conductive layer including the conductive metal nanowires is formed on a surface of the first conductive layer. In this case, the substrate may be disposed on a surface of the first conductive layer opposite to the second conductive layer.

The substrate may be a transparent substrate. A material of the substrate is not particularly limited, and it may be a glass substrate, a semiconductor substrate (e.g., Si), a polymeric substrate, or a combination thereof, or may be a substrate laminated with an insulation layer and/or a conductive layer. For non-limiting examples, the substrate may include an inorganic material, such as an oxide glass or a glass, a polyester, such as polyethylene terephthalate, polybutylene terephthalate, or polyethylene naphthalate, polycarbonate, an acryl polymer, a cellulose or a derivative thereof, a polymer such as a polyimide, or organic/inorganic hybrid material, or a combination thereof. The acryl polymer includes any polymer derived from polymerization of an acryl or a methacryl monomer, e.g., acrylonitrile, methacrylonitrile, acrylamide, methacrylamide, acrylic acid, methacrylic acid, or an ester of acrylic or methacrylic acid.

The thickness of the substrate is also not particularly limited, and may be appropriately selected according to the desired final product. For example, the substrate may have a thickness of greater than or equal to about 0.5 µm, for example greater than or equal to about 1 µm, or greater than or equal to about 10 µm, but is not limited thereto. The thickness of the substrate may be less than or equal to about 1 mm, for example less than or equal to about 500 µm, or less than or equal to about 200 µm, but is not limited thereto. An additional layer (e.g., an undercoat) may be disposed between the substrate and the conductive layer, if desired (e.g., for controlling a refractive index).

The first conductive layer or the second conductive layer may be formed by applying an appropriate coating composition (including the nanosheets or the nanowires) on a substrate or a first conductive layer, respectively, and removing the solvent. The coating composition may further include an appropriate solvent (e.g., water, an organic solvent miscible with water or immiscible with water, or the like), a binder, and a dispersing agent (e.g., hydroxypropyl methylcellulose (HPMC)).

For example, an ink composition including the metal nanowires may be prepared using any suitable method, or a commercially available product may be used. For example, the ink may have the composition set forth in Table 2.

TABLE 2

| | Material | Amount |
|---|---|---|
| Conductive metal | Conductive metal (e.g., Ag) nanowire aqueous solution (conc.: about 0.001 to about 10.0 wt % conductive metal nanowires) | 5 to 40 wt % |
| Solvent | Water | 20 to 70 wt % |
| | Alcohol (ethanol) | 10 to 40 wt % |
| Dispersing agent | Hydroxypropyl methyl cellulose (HPMC) aqueous solution (conc.: about 0.05 to about 5 wt % HPMC) | 1 to 10 wt % |

* wt % is weight percent

For example, the coating composition including the aforementioned ruthenium oxide nanosheets may be an aqueous solution including the components in Table 3, but is not limited thereto.

TABLE 3

| | Material | Amount |
|---|---|---|
| Conductive material | $RuO_{2+x}$ aqueous solution (concentration: 0.001-10.0 g/L, for example, about 0.01 g/L to about 10 g/L, or about 0.5 g/L to about 2 g/L) | 30 to 70 wt % |
| Solvent | Water | 10 to 50 wt % |
| | Isopropanol | 1 to 20 wt % |
| Dispersing agent | Hydroxypropyl methylcellulose aqueous solution (about 0.05 wt % to about 5 wt %) | 5- to 30 wt % |

In some embodiments, when the concentration of the ruthenium oxide nanosheets in the aqueous solution is greater than about 0.001 gram per liter (g/L), a transparent conductor may be prepared to have a desired electrical conductivity by including a sufficient number of $RuO_{2+x}$ nanosheets. When the concentration of the nanosheet aqueous solution is less than about 10 g/L, a transparent and flexible conductor may be prepared without any substantial loss of transparency or flexibility. In addition, in order to increase a dispersibility of $RuO_{2+x}$ nanosheets, the $RuO_{2+x}$ nanosheet solution may include a dispersing agent, such as a hydroxypropyl methyl cellulose (HPMC) aqueous solution.

The concentration of the HPMC aqueous solution may be from about 0.05 weight percent (wt %) to about 5 wt %, based on a total weight of the solution. In some embodiments, such ranges make it possible to maintain the dispersion of the $RuO_{2+x}$ nanosheets in the solution without causing any adverse effects due to the presence of organic substances, for example, a decrease in electrical conductivity or a decrease in transmittance.

The composition may be applied onto a substrate, or optionally, on the first or second conductive layer, and then may be dried and/or heat-treated if desired to produce the conductive layer. The coating of the composition may be performed by various methods, including for example, bar coating, blade coating, slot die coating, spray coating, spin coating, gravure coating, inkjet printing, or a combination thereof. The nanosheets may contact each other to provide an electrical connection. When the prepared nanosheets are physically connected to provide as thin a layer as possible, it may possible to further improve transmittance.

The first conductive layer and/or the second conductive layer may include an organic binder for binding the nanowires and/or the nanosheets. The binder may play a role in appropriately adjusting viscosity of the composition for a conductive layer or enhancing adherence of the nanosheets on the substrate. Examples of the binder may include, but are not limited to, methyl cellulose, ethyl cellulose, hydroxypropyl methyl cellulose (HPMC), hydroxypropyl cellulose (HPC), xanthan gum, polyvinyl alcohol (PVA), polyvinylpyrrolidone (PVP), carboxylmethyl cellulose, hydroxyethyl cellulose, or a combination thereof. An amount of binder may be appropriately selected by the person of skill in the art without undue experimentation, and is not particularly limited. In non-limiting examples, an amount of the binder may be about 1 to about 100 parts by weight, based on 100 parts by weight of the nanosheets, (or the nanowires, in the case of the second conductive layer).

The electrical conductor may further include an overcoating layer (OCL) including a thermosetting resin, an ultraviolet (UV) light-curable resin, or a combination thereof, on at least one of the first conductive layer and the second conductive layer. Examples of the thermosetting resin and the UV light-curable resin for the OCL are known in the art. In some embodiments, the thermosetting resin and the UV light-curable resin for the OCL may include urethane (meth)acrylate, a perfluoropolymer having a (meth)acrylate group, a poly(meth)acrylate having a (meth)acrylate group, an epoxy (meth)acrylate, or a combination thereof. The overcoating layer may further include an inorganic oxide fine particle (e.g., a silica fine particle). A method of forming an OCL from the aforementioned materials on the conductive layer is also known and is not particularly limited.

The electrical conductor having the aforementioned structure may have significantly improved conductivity and high light transmittance and may provide enhanced flexibility. The electrical conductor may have light transmittance of greater than or equal to about 81%, for example greater than or equal to about greater than or equal to about 83%, greater than or equal to about 85%, 88%, or greater than or equal to about 89%, with respect to light having a wavelength of 550 nm. The electrical conductor may have a sheet resistance of less than or equal to about 5,000 ohms pre square ($\Omega$/sq), for example, less than or equal to about 3,000 $\Omega$/sq, less than or equal to about 2,500 $\Omega$/sq, less than or equal to about 2,400 $\Omega$/sq, less than or equal to about 2,300 $\Omega$/sq, or less than or equal to about 2,200 $\Omega$/sq as measured by four point probe method.

The sheet resistance may be less than about 100 ohms per square ($\Omega$/sq), for example, less than or equal to about 90 $\Omega$/sq, less than or equal to about 80 $\Omega$/sq, less than or equal to about 70 $\Omega$/sq, less than or equal to about 60 $\Omega$/sq, less than or equal to about 50 $\Omega$/sq, less than or equal to about 40 $\Omega$/sq, less than or equal to about 39 $\Omega$/sq, less than or equal to about 38 $\Omega$/sq, less than or equal to about 37 $\Omega$/sq, less than or equal to about 36 $\Omega$/sq, or less than or equal to about 35 $\Omega$/sq.

The electrical conductor may exhibit enhanced flexibility. For example, after being folded multiple times, the electrical conductor may have a resistance change that is significantly lower than a resistance change of the electrical conductor including the nanowires only. In some embodiments, the electrical conductors may have a resistance change of less than or equal to about 60%, for example, less than or equal to about 50%, less than or equal to about 40%, or less than or equal to about 30%, after folding 200,000 times at a curvature radius of 1 millimeter (mm) (1 R).

In some embodiments, a method of producing the aforementioned electrical conductor may include:

heat-treating a mixture of a metal oxide and an alkali metal to prepare an alkali metal-substituted layered ruthenium oxide;

treating the alkali metal-substituted layered ruthenium oxide with an acidic solution to prepare a proton exchanged layered ruthenium oxide, wherein at least a portion of the alkali metal is replaced with a proton;

contacting the proton exchanged layered ruthenium oxide with a C1 to C20 alkyl ammonium compound to prepare an alkyl ammonium-layered ruthenium oxide; and mixing the alkyl ammonium-layered ruthenium oxide with a solvent to obtain an exfoliated ruthenium oxide nanosheet, wherein the method further includes conducting a surface-doping to obtain a plurality of surface-doped ruthenium oxide nanosheets, and wherein the surface doping includes adding the alkali metal-substituted layered ruthenium oxide, the proton exchanged layered ruthenium oxide, or the exfoliated ruthenium oxide nanosheet to an aqueous solution including a precursor (e.g., a ruthenium halide, a ruthenium chalcogenide, an alkali metal halide, an ammonium halide, or a ruthenium-Group 15 element compound) to form a mixture; and heating the mixture at a temperature of greater than or equal to about 100° C.

The surface doping may be conducted with respect to the alkali metal-substituted layered ruthenium oxide, for example, by combining the alkali metal-substituted layered ruthenium oxide with the aqueous solution to form the mixture and heating the mixture, and the method may further include drying a surface-doped product (e.g. the heated mixture).

The surface doping may be conducted with respect to the exfoliated ruthenium oxide nanosheet, for example, by combining the exfoliated ruthenium oxide nanosheet with the aqueous solution to form the mixture and heating the mixture, and the method may further include dispersing a surface-doped product (e.g. the heated mixture) in a mixture of a solvent and an intercalant (e.g., an alkyl ammonium compound) for re-exfoliation (e.g., after a washing with distilled water and a vacuum drying thereof).

Details of the alkali metal-substituted layered ruthenium oxide, the proton exchanged layered ruthenium oxide, the ruthenium oxide nanosheet, the hydrothermal treatment for surface doping, the precursor compound are the same as set forth above.

Some embodiments provide a one dimensional (1 D)/two dimensional (2D) hybrid structure including a nanosheet layer and a nanowire layer, wherein the nanosheet layer includes a plurality of ruthenium oxide nanosheets being surface-doped with a halogen, a chalcogen, and/or a Group 15 element and the nanowire layer includes a plurality of a conductive metal nanowires, wherein in the nanosheet layer, at least two nanosheets of the plurality of ruthenium oxide nanosheets are in contact with each other to provide an electrical path and the nanowire layer is in contact with at least two ruthenium oxide nanosheets of the plurality of ruthenium oxide nanosheets.

Details of the nanosheet layer are the same as those of the first conductive layer. Details of the nanowire layer are the same as those of the second conductive layer. The 1D/2D hybrid structure may be prepared in the same manner as the aforementioned electrical conductor.

In another embodiment, an electronic device includes the electrical conductor or the 1 D/2D hybrid structure.

The electronic device may be a flat panel display, a touch screen panel, a solar cell, an e-window, an electrochromic mirror, a heat mirror, a transparent transistor, or a flexible display.

In an exemplary embodiment, the electronic device may be a touch screen panel (TSP). The detailed structure of the touch screen panel can be determined by one of skill in the art without undue experimentation. The schematic structure of the touch screen panel is shown in FIG. 3. Referring to FIG. 3, the touch screen panel may include a first transparent conductive film 20, a first transparent adhesive film (e.g., an optically clear adhesive (OCA)) 30, a second transparent conductive film 40, a second transparent adhesive film 50, and a window 60 for a display device, layered on a panel for a display device 10 (e.g., an LCD panel). The first transparent conductive film 20 and/or the second transparent conductive film 40 may be the aforementioned electrical conductor or the hybrid 1D/2D structure.

In addition, while an example of applying the conductor to a touch screen panel (e.g., a transparent electrode of TSP) is illustrated below, the conductor may be used as an electrode for other electronic devices which include a transparent electrode without a particular limit. For example, the conductor may be applied as a pixel electrode and/or a common electrode for a liquid crystal display (LCD), an anode and/or a cathode for an organic light emitting diode device, or a display electrode for a plasma display device.

Hereinafter, an embodiment is illustrated in more detail with reference to examples. These examples, however, are not in any sense to be interpreted as limiting the scope of this disclosure.

EXAMPLES

Measurement

[1] Measurement of sheet resistance:
Measuring equipment: Mitsubishi loresta-GP (MCP-T610), ESP type probes (MCP-TP08P)
Sample size: width about 20 cm×length about 30 cm
Measurement of sample: average value obtained from at least 9 separate measurements

[2] Measurement of light transmittance:
Measuring equipment: NIPPON DENSHOKU INDUSTRIES (NDH-7000 SP)
Sample size: width about 20 cm×length about 30 cm
The wavelength of light from the light source: 550 nm
Measurement of sample: average value obtained from at least 9 separate measurements

[3] Measurement of haze:
Measuring equipment: NIPPON DENSHOKU INDUSTRIES (NDH-7000 SP)
Sample size: width about 20 cm×length about 30 cm
Measurement of sample: average value obtained from at least 9 separate measurements

[4] Scanning Electron Microscopic (SEM) analysis and Energy-dispersive X-ray spectroscopy (EDX) analysis are made by using FE-SEM (Field Emission Scanning Electron Microscope), Hitachi (SU-8030).

[5] X-ray diffraction analysis is made by using MP-XRD X'Pert PRO (Phillips).

[6] X-ray Photoelectron Spectroscopic analysis is made by using Quantera II XPS Scanning Microprobe.

Example 1

Preparation of Ruthenium Oxide Nanosheets

[1] $K_2CO_3$ and $RuO_2$ are mixed at a mole ratio of 5:8, and the mixture is pelletized. 4 grams (g) of the obtained pellet is introduced into an alumina crucible and heated in a tube furnace at 850° C. for 12 hours (h) under a nitrogen atmosphere. The total weight of the pellet may be changed within the range of 1 g to 100 g, if desired. Then, the furnace is cooled to room temperature and the treated pellet is removed and ground to provide a fine powder. An X-ray Diffraction Analysis and Electron Microscopic Analysis are made for the obtained find powder, and the results thereof confirm that the powder includes a layered ruthenium oxide.

The obtained fine powder is washed with 100 milliliters (mL) to 4 liters (L) of water for 24 h, and then filtered to provide a powder, the composition of which is $K_{0.2}RuO_{2.1} \cdot nH_2O$ (wherein n is about 0.1 to 0.9).

Figure 4A:
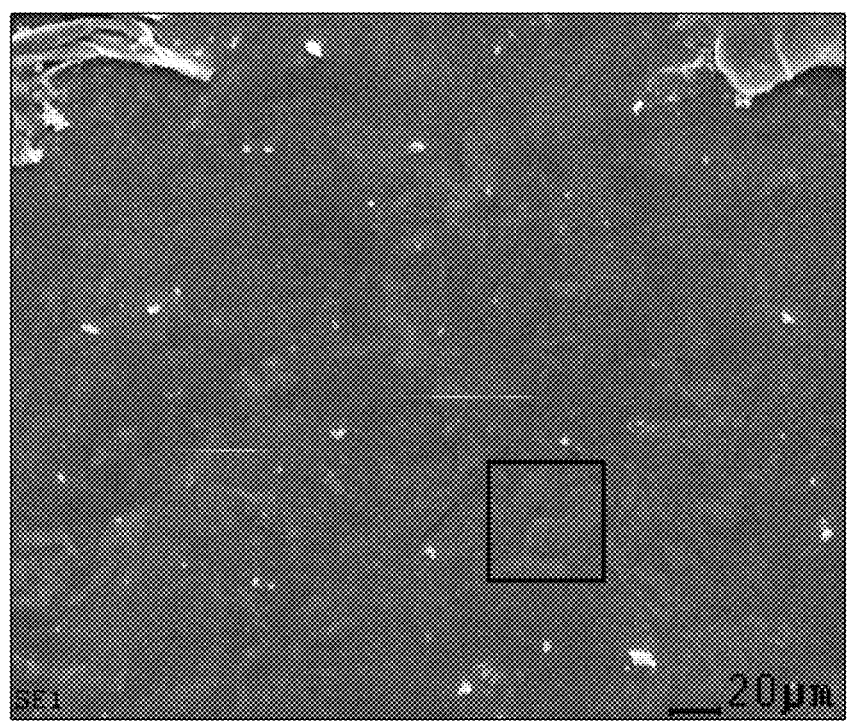
FIG. 4A is a scanning electron microscope (SEM) image of a protonated ruthenium oxide in Example 1 prior to being treated with $RuCl_3$.
Figure 4B:
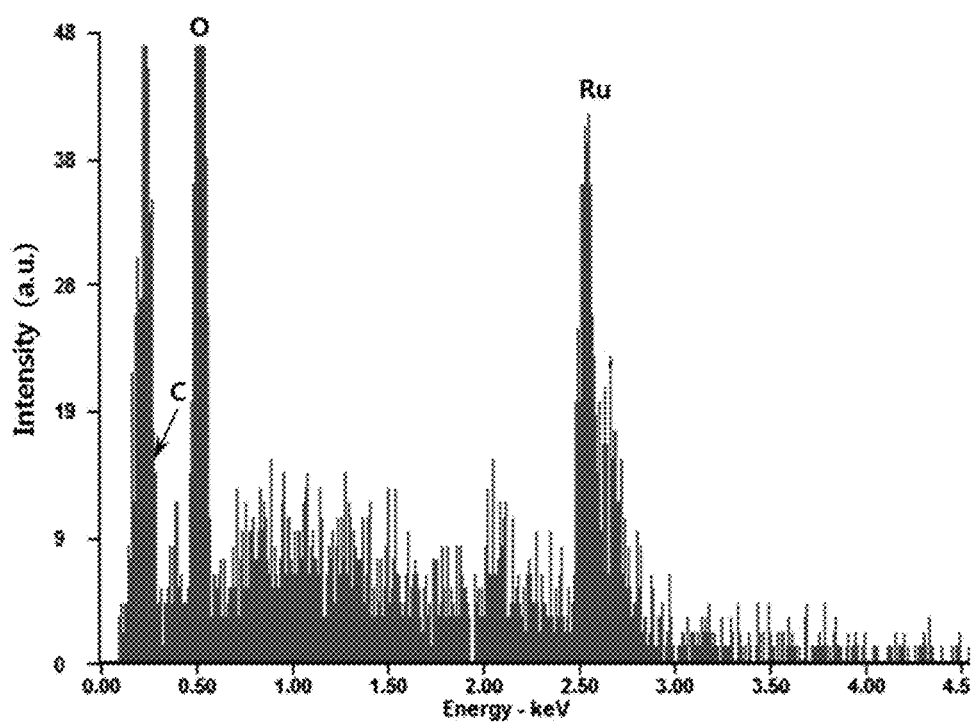
FIG. 4B is a graph of intensity (arbitrary units, a.u.) versus energy (kiloelectron volts, keV) showing the results of energy dispersive X-ray spectroscopy (EDX) analysis of the protonated ruthenium oxide in FIG. 4A.

The $K_{0.2}RuO_{2.1} \cdot nH_2O$ powder is then introduced into a 1 molar (M) HCl solution and agitated for 3 days (d) and introduced again into a 0.5 M $H_2SO_4$ aqueous solution and agitated for 2 d. The resulting product is filtered to provide a powder of proton exchanged layered ruthenium oxide, the composition of which is $H_{0.2}RuO_{2.1} \cdot nH_2O$. A scanning electron microscopic analysis and an EDX analysis are conducted for the obtained powder and the results are shown in FIG. 4A, FIG. 4B, and Table 4. The results of FIG. 4A confirm that the $H_{0.2}RuO_{2.1}nH_2O$ particle has a plate shape. The results of FIG. 4B and Table 4 confirm that the powder does not include chlorine (Cl).

TABLE 4

| element | Wt % | At % |
|---|---|---|
| $C_K$ | 1.25 | 5.90 |
| $O_K$ | 13.01 | 46.05 |
| $Ru_L$ | 85.74 | 48.06 |
| $Cl_K$ | 0.00 | 0.00 |

Figure 5:
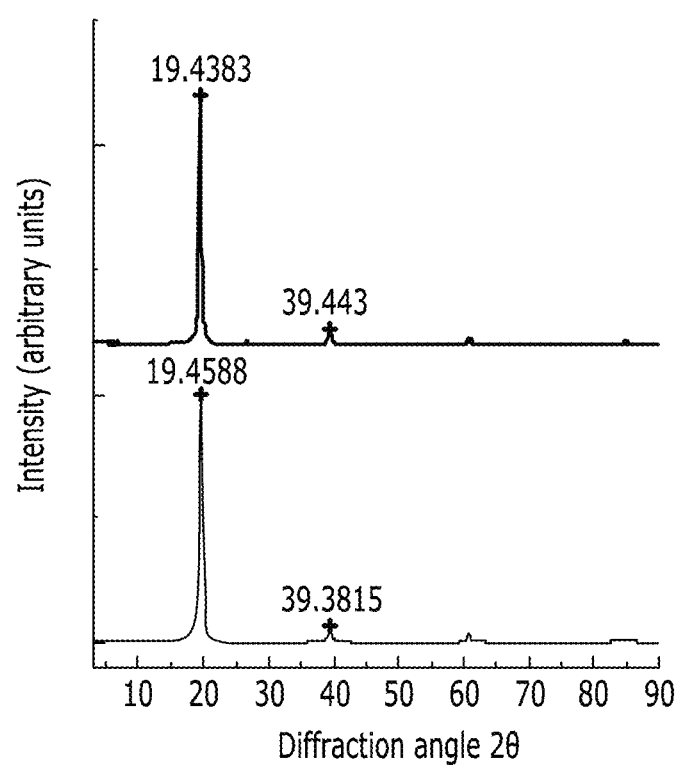
FIG. 5 is a graph of normalized intensity versus diffraction angle (degrees two-theta (2θ)) showing the results of X-ray diffraction analysis of the protonated ruthenium oxide in Example 1 prior to (lower) and after (upper) being treated with $RuCl_3$.

The results of X-ray diffraction analysis of the obtained powder are shown in FIG. 5.

Figure 6A:
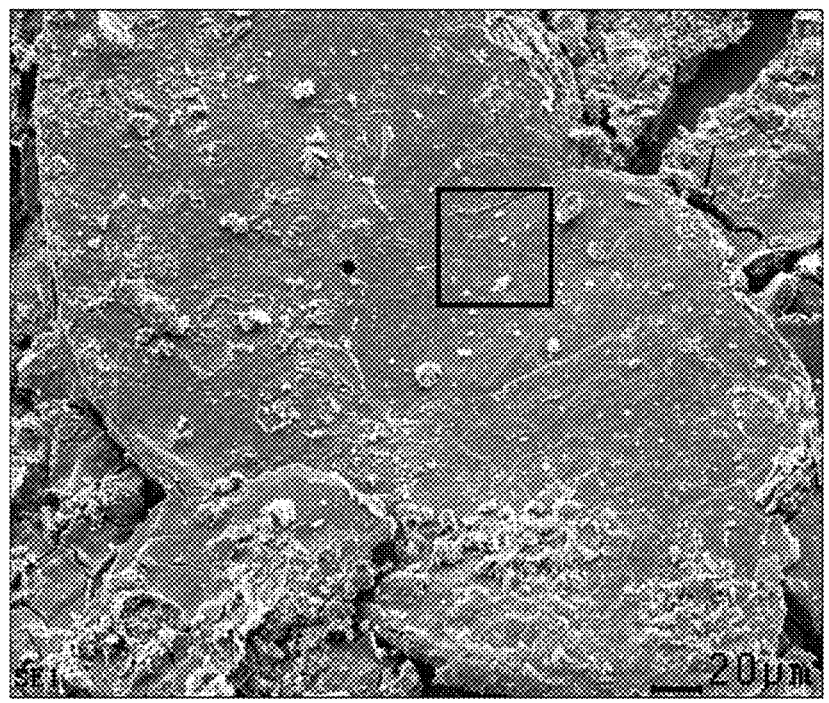
FIG. 6A is an SEM image of protonated ruthenium oxide in Example 1 after being treated with $RuCl_3$.
Figure 6B:
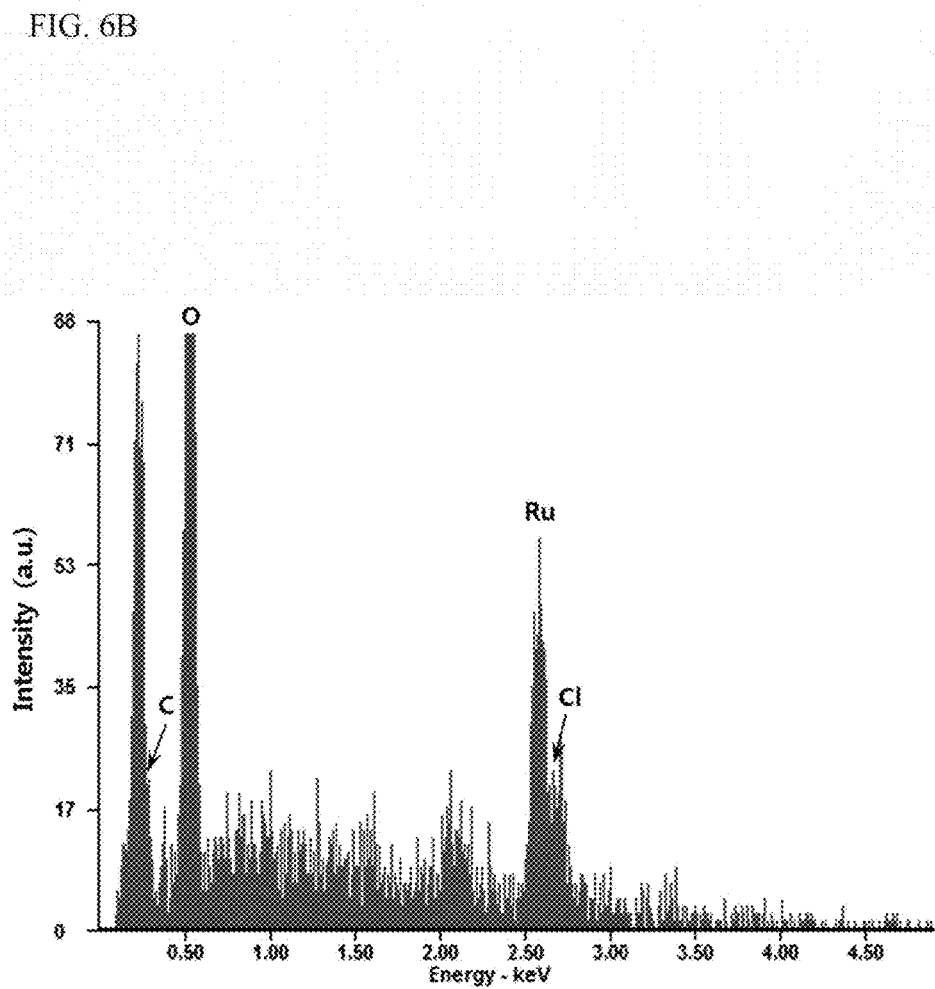
FIG. 6B is a graph of intensity (arbitrary units, a.u.) versus energy (kiloelectron volts, keV) showing the results of an EDX analysis of the protonated ruthenium oxide in FIG. 6A.

[2] The proton exchanged layered ruthenium oxide powder and a $RuCl_3$ powder are mixed at a mole ratio of 0.9:0.1 and the mixture is placed in a 50 mL container. 400 mL of distilled water is added to the container, which is then subjected to a hydrothermal treatment at a temperature of about 180° C. for 24 hours using an autoclave. After the completion of the hydrothermal treatment, the container is placed in an oven at 50° C. for drying and thereby the treated powder is obtained. An X-ray diffraction analysis, a scanning electron microscopic analysis, and an EDX analysis are carried out for the obtained powder and the results are shown in FIG. 5, FIG. 6A, FIG. 6B, and Table 5.

TABLE 5

| Element | Wt % | At % |
|---|---|---|
| $C_K$ | 1.42 | 6.06 |
| $O_K$ | 15.77 | 50.37 |
| $Ru_L$ | 80.98 | 40.94 |
| $Cl_K$ | 1.83 | 2.63 |

The results of FIG. 5 confirm that after the surface doping, the nanosheets do not contain re-precipitated $RuCl_3$ crystals. In addition, the results of FIG. 5 suggest that the surface doping does not bring forth any substantial changes in the crystal structure of the nanosheet. These results also suggest that the $Ru^{3+}$ and $Cl^-$ ions react with the $H_xRuO_{2.1}nH_2O$.

The results of FIG. 6A confirm that the obtained product is in the same form of a plate particle as its original form. The results of FIG. 6B and Table 5 confirm that the hydrothermally treated nanosheets include the chlorine (Cl).

[3] 1 g of the $H_{0.2}RuO_{2.1}$ powder as hydrothermally treated with $RuCl_3$ is introduced into 250 mL of an aqueous solution of tetramethyl ammonium hydroxide (TMAOH) and tetrabutylammonium hydroxide (TBAOH), and agitated for greater than or equal to 10 d. In the aqueous solution, the concentrations of TMAOH and TBAOH are $TMA^+/H^+=5$ and $TBA^+/H^+=5$, respectively. After completing all processes, the final solution is centrifuged under the conditions of 2,000 revolutions per minute (rpm) for 30 minutes (min) to obtain exfoliated $RuO_2$, nanosheets having the surface doped chlorine.

[4] The coating liquid including $RuO_{2.1}$ nanosheets having the surface doped chlorine is prepared to have the following composition:

An aqueous dispersion of $RuO_{2.1}$ nanosheets having the surface doped chlorine: 2 g (concentration: about 1 g/L)
An aqueous solution of HPMC: (0.25%) 0.5 g
Isopropanol: 2.5 g
Water: 2 g The $RuO_{2.1}$ nanosheet coating liquid is bar-coated on a polycarbonate substrate and dried at 85° C. under an air atmosphere. The processes are repeated several times to prepare several first conductive layers, each having a different light transmittance.

Figure 7:
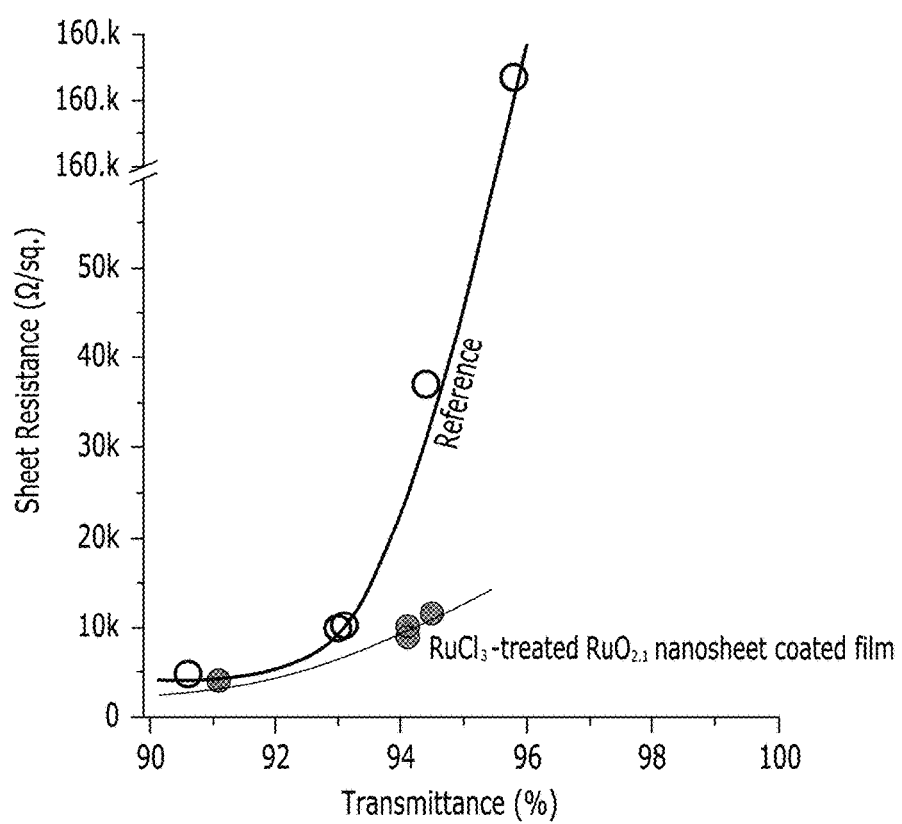
FIG. 7 is a graph of sheet resistance (ohms per square, Ω/sq) versus transmittance (percent, %) for each of the electrical conductors prepared in Example 1 and Comparative Example 1, respectively.

The light transmittance and the sheet resistance of the obtained first conductive layer ($RuCl_3$ treated $RuO_{2.1}$ coated film) are measured and the results are compiled in FIG. 7.

The XPS analysis for the obtained first conductive layer is shown in Table 6 (below) and in FIG. 8.

Comparative Example 1

[1] Ruthenium oxide nanosheets are prepared in the same manner as in Example 1, except that the hydrothermal treatment using the $RuCl_3$ aqueous solution is not carried out.

[2] The first conductive layers having different light transmittance are prepared on a polycarbonate substrate in the same manner as in Example 1, except that the ruthenium oxide nanosheets prepared in step [1] are used instead of the $RuO_{2.1}$ nanosheets having the surface doped Cl (Example 1).

The light transmittance and the sheet resistance of the prepared first conductive layer (Reference) are measured and the results are compiled in FIG. 7. The XPS analysis for the obtained first conductive layer is shown in Table 6 and FIG. 8.

The results of FIG. 7 confirm that the electrical conductor including the ruthenium oxide nanosheets with the surface-doped Cl ($RuCl_3$ treated $RuO_{2.1}$ coated film) has a sheet resistance of 9,006 ohm/sq. and a light transmittance of 94.1%, while the electrical conductor of Comparative Example 1 (Reference) has a sheet resistance of 37,000 ohm/sq. and a similar level of light transmittance. These results suggest that the electrical conductor including the ruthenium oxide nanosheets with the surface-doped Cl may exhibit a much lower sheet resistance than the electrical conductor including the ruthenium oxide nanosheets with no surface doping while having a similar level of light transmittance.

TABLE 6

| | Concentration of the atom (at. %) | | | | |
|---|---|---|---|---|---|
| | O1s | Na1s | S2p | Cl2p | Ru3p3 |
| $RuO_{2.1}$ film (Comp. 1) | 80.9 | 1.23 | 0.65 | 0 | 17.22 |
| Cl: $RuO_2$ film (EX 1) | 74.06 | 0.38 | 0 | 1.1 | 24.46 |

Figure 8:
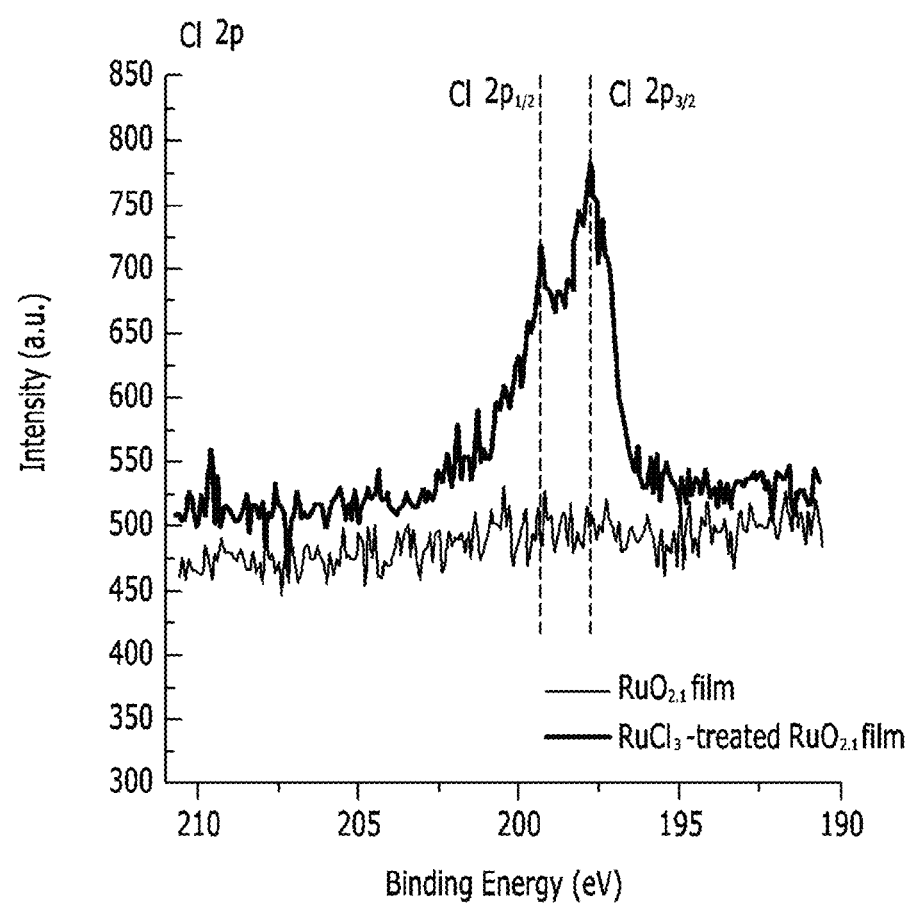
FIG. 8 is a graph of intensity (a.u.) versus binding energy (electron volts, eV) showing the results of X-ray photoelectron spectroscopy (XPS) analysis of the first layer prepared in Example 1 and Comparative Example 1.

Results of Table 6 and FIG. 8 confirm that the first conductive layer of Example 1 includes Cl and that the first conductive layer of Comparative Example 1 does not include Cl.

Example 2

Preparation of ruthenium oxide nanosheets with surface-doped Cl

[1] $K_2CO_3$ and $RuO_2$ are mixed at a mole ratio of 5:8, and the mixture is pelletized. 4 grams (g) of the obtained pellet is introduced into an alumina crucible and heated in a tube furnace at 850° C. for 12 hours (h) under a nitrogen atmosphere. The total weight of the pellet may be changed within the range of 1 g to 100 g, if desired. Then, the furnace is cooled to room temperature, and the treated pellet is removed and ground to provide a fine powder.

The obtained fine powder is washed with 100 milliliters (mL) to 4 liters (L) of water for 24 h, and then filtered to provide a hydrate powder, the composition of which is $K_{0.2-0.25}RuO_{2.1}.nH_2O$.

[2] The hydrate powder and a $RuCl_3$ powder are mixed at a mole ratio of 0.9:0.1 and the mixture is placed in a 50 mL container. 400 mL of distilled water is added to the container, which is then subjected to a hydrothermal treatment at a temperature of about 180° C. for 24 hours using an autoclave. After the completion of the hydrothermal treatment, the container is placed in an oven at 50° C. for 12 h in order to conduct drying and thereby the $RuCl_3$ treated $K_{0.2-0.25}RuO_{2.1}$ powder is obtained.

[3] The $RuCl_3$ treated $K_{0.2-0.25}RuO_{2.1}$ powder is then introduced into a 1 molar (M) HCl solution and agitated for 3 days (d) and introduced again into a 0.5 M $H_2SO_4$ aqueous solution and agitated for 2 d. The resulting product is filtered to provide a powder of proton exchanged and $RuCl_3$ treated layered ruthenium oxide ($RuCl_3$ treated $H_{0.2}RuO_{2.1}$). 1 g of the $RuCl_3$ treated $H_{0.2}RuO_{2.1}$ powder is introduced into 250 mL of an aqueous solution of tetramethyl ammonium hydroxide (TMAOH) and tetrabutylammonium hydroxide (TBAOH), and agitated for at least 10 d. In the aqueous solution, the concentrations of TMAOH and TBAOH are TMA+/H+=5 and TBA+/H+=5, respectively. After completing all processes, the final solution is centrifuged under the conditions of 2,000 revolutions per minute (rpm) for 30 minutes (min) to obtain exfoliated $RuO_{2.1}$ nanosheets with the surface doped chlorine.

[4] The coating liquid including the exfoliated $RuO_{2.1}$ nanosheets having the surface doped chlorine (Cl) is prepared to have the following composition:

An aqueous dispersion of $RuO_{2.1}$ nanosheets having the surface doped chlorine: 1 g (concentration: about 1 g/L)
An aqueous solution of HPMC: (0.3 wt %) 0.5 g
Isopropanol: 3 g
Water: 1 g The $RuO_{2.1}$ nanosheet coating liquid is bar-coated on a polycarbonate substrate and dried at 85° C. under an air atmosphere. The processes are repeated three to four times to provide a first conductive layer. The first conductive layer may have a sheet resistance of about 8,000 to 10,000 ohm/sq. and a light transmittance of about 96 to 97%.

Example 3

Preparation of ruthenium oxide nanosheets with surface-doped Cl

[1] $K_2CO_3$ and $RuO_2$ are mixed at a mole ratio of 5:8, and the mixture is pelletized. 4 grams (g) of the obtained pellet is introduced into an alumina crucible and heated in a tube furnace at 850° C. for 12 hours (h) under a nitrogen atmosphere. The total weight of the pellet may be changed within the range of 1 g to 100 g, if desired. Then, the furnace is cooled to room temperature, and the treated pellet is removed and ground to provide a fine powder.

The obtained fine powder is washed with 100 milliliters (mL) to 4 liters (L) of water for 24 h, and then filtered to provide a powder, the composition of which is $K_{0.2}RuO_{2.1} \cdot nH_2O$.

The $K_{0.2}RuO_{2.1} \cdot nH_2O$ powder is then introduced into a 1 molar (M) HCl solution and agitated for 3 days (d) and introduced again into a 0.5 M $H_2SO_4$ aqueous solution and agitated for 2 d. The resulting product is filtered to provide a powder of proton exchanged layered ruthenium oxide, the composition of which is $H_{0.2}RuO_{2.1}$.

1 g of the $H_{0.2}RuO_{2.1}$ powder is introduced into 250 mL of an aqueous solution of tetramethyl ammonium hydroxide (TMAOH) and tetrabutylammonium hydroxide (TBAOH), and agitated for at least 10 d. In the aqueous solution, the concentrations of TMAOH and TBAOH are TMA+/H+=5 and TBA+/H+=5, respectively. After completing all processes, the final solution is centrifuged under the conditions of 2,000 revolutions per minute (rpm) and 30 minutes (min) to obtain exfoliated $RuO_{2.1}$ nanosheets.

[2] The exfoliated $RuO_{2.1}$ nanosheets and a $RuCl_3$ powder are mixed at a mole ratio of 0.9:0.1 and the mixture is placed in a 50 mL container. 400 mL of distilled water is added to the container, which is then subjected to a hydrothermal treatment at a temperature of about 180° C. for 24 hours using an autoclave.

After the completion of the hydrothermal treatment, the container is placed in an oven at 50° C. for 12 h in order to conduct drying and thereby the $RuCl_3$ treated $RuO_{2.1}$ nanosheet powder is obtained.

The $RuCl_3$ treated $RuO_{2.1}$ nanosheet powder is introduced into a mixture of distilled water (as a solvent) and TMAOH and TBAOH (as a intercalant, TMA+/H+=5 and TBA+/H+=5) and stirred for one day to conduct re-exfoliation. As a result, $RuO_{2.1}$ nanosheets with the surface doped Cl are obtained.

[4] The coating liquid including $RuO_{2.1}$ nanosheets having the surface doped chlorine is prepared to have the following composition:

An aqueous dispersion of $RuO_{2.1}$ nanosheets having the surface doped chlorine: 1 g (concentration: about 1 g/L)
An aqueous solution of HPMC: (0.3%) 0.5 g
Isopropanol: 3 g
Water: 1 g The $RuO_{2.1}$ nanosheet coating liquid is bar-coated on a polycarbonate substrate and dried at 85° C. under an air atmosphere. The processes are repeated three to four times to provide a first conductive layer. The first conductive layer may have a sheet resistance of about 10,000 to 12,000 ohm/sq. and a light transmittance of about 96 to 97%.

Example 4

Preparation of the electrical conductors including the nanowire layer and the ruthenium oxide nanosheet layer

[1] Ag nanowire containing coating liquid including the following components is prepared.

Ag nanowire aqueous solution (conc.; 0.5 wt %, the average diameter of the Ag nanowire=30 nm): 3 g
Solvent: water 7 g and ethanol 3 g
Binder: hydroxypropyl methyl cellulose aqueous solution (conc.: 0.3%) 0.5 g The Ag nanowire-containing coating liquid is bar-coated on the first conductive layer (i.e., the layer of the ruthenium oxide nanosheets with the surface doped Cl) prepared in Example 1 and then is dried at 85° C. under an air atmosphere for 1 min to produce an electrical conductor.

[3] The sheet resistance, the transmittance, and the haze of the electrical conductor are measured in the same manner as set forth above. As a result, the sheet resistance is 32.42 Ω/sq, the transmittance is 89.14%, and the haze is 1.41.

Example 5

[1] Ag nanowire containing coating liquid including the following components is prepared.

Ag nanowire aqueous solution (conc.; 0.5 wt %, the average diameter of the Ag nanowire=30 nm): 3 g
Solvent: water 7 g and ethanol 3 g
Binder: hydroxypropyl methyl cellulose aqueous solution (conc.: 0.3 wt %) 0.5 g The Ag nanowire-containing coating liquid is bar-coated on a polycarbonate substrate and then is dried at 85° C. under an air atmosphere for 1 min to prepare a silver nanowire layer.

[2] The $RuO_{2+x}$ coating liquid prepared in Example 1 is bar-coated on the silver nanowire layer, and then is dried at 85° C. under an air atmosphere for 1 min to obtain an electrical conductor.

[3] The sheet resistance, the transmittance, and the haze of the electrical conductor are measured. As a result, the sheet resistance is 27.76 Ω/sq, the transmittance is 81.32%, and the haze is 1.76.

Example 6

The electrical conductor prepared in Example 4 is fixed on a flat bottom and urethane acrylate (manufactured by Seukyung Co., Ltd.) is coated thereon using a wired bar and then is dried at room temperature for at least one min. Then, the resulting product is dried in an oven at about 100° C. for one min and then is irradiated with UV light using a UV lamp (wavelength: 365 nm, intensity: 800 millijoules per square centimeter ($mJ/cm^2$)) for 15 sec to conduct a cross-linking polymerization of the acrylate (i.e., a curing process) and thereby form an over-coat layer.

The sheet resistance, the transmittance, and the haze of the electrical conductor are measured. As a result, the sheet resistance is 28.28 Ω/sq, the transmittance is 83.79%, and the haze is 1.35.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrical conductor comprising:
a first conductive layer comprising a plurality of ruthenium oxide nanosheets, wherein at least one ruthenium oxide nanosheet of the plurality of ruthenium oxide nanosheets are surface-doped with any of a halogen, a chalcogen, a Group 15 element, and a combination thereof,
wherein the plurality of ruthenium oxide nanosheets have an average lateral size of greater than or equal to about 0.1 micrometers and less than or equal to about 100 micrometers, and a thickness of less than or equal to about 3 nanometers.

2. The electrical conductor of claim 1, wherein the halogen comprises F, Cl, Br, I, or a combination thereof, the chalcogen comprises S, Se, Te, or a combination thereof, and the Group 15 element comprises N, P, As, or a combination thereof.

3. The electrical conductor of claim 1, wherein the halogen, the chalcogen, or the Group 15 element is present as an ionic species, a surface-bound reactive group, an oxyhalide, an oxy chalcogenide, or a combination thereof.

4. The electrical conductor of claim 1, wherein the electrical conductor further comprises a second conductive layer that is disposed on a first surface of the first conductive layer, and
wherein the second conductive layer comprises a plurality of conductive metal nanowires.

5. The electrical conductor of claim 4, wherein the plurality of conductive metal nanowires comprises silver, copper, gold, aluminum, cobalt, palladium, or a combination thereof.

6. The electrical conductor of claim 4, wherein the plurality of conductive metal nanowires have an average diameter of less than or equal to about 50 nanometers and an average length of greater than or equal to about 1 micrometer.

7. The electrical conductor of claim 4, wherein at least one of the first conductive layer and the second conductive layer further comprises a binder.

8. The electrical conductor of claim 4, wherein the electrical conductor further comprises an overcoating layer comprising a thermosetting resin, an ultraviolet light-curable resin, or a combination thereof, and
wherein the overcoating layer is disposed on at least one of the first conductive layer and the second conductive layer.

9. The electrical conductor of claim 4, wherein the electrical conductor further comprises a transparent substrate that is disposed on an opposite second surface of the first conductive layer.

10. The electrical conductor of claim 1, wherein the electrical conductor is a transparent conductive film.

11. The electrical conductor of claim 1, wherein the first conductive layer is a discontinuous layer comprising spatially separated ruthenium oxide nanosheets of the plurality of ruthenium oxide nanosheets, and
wherein the ruthenium oxide nanosheets cover at least about 50% of a total area of the first conductive layer.

12. The electrical conductor of claim 1, wherein the electrical conductor has a transmittance of greater than or equal to about 85% at a thickness of a first conductive layer of 100 nanometers or less, with respect to light having a wavelength of 550 nanometers, and
wherein the electrical conductor has sheet resistance of less than or equal to about $1.2 \times 10^4$ ohms per square.

13. The electrical conductor of claim 1, wherein the electrical conductor has a resistance change of less than or equal to about 60% after folding 200,000 times at a curvature radius of 1 millimeter.

14. A method of preparing the electrical conductor of claim 1, the method comprising:
heat-treating a mixture of a ruthenium oxide and an alkali metal compound to prepare an alkali metal-substituted layered ruthenium oxide;
treating the alkali metal-substituted layered ruthenium oxide with an acidic solution to prepare a proton exchanged layered ruthenium oxide, wherein at least a portion of the alkali metal is replaced with a proton;
contacting the proton exchanged layered ruthenium oxide with a C1 to C20 alkyl ammonium compound to prepare a C1 to C20 alkyl ammonium-layered ruthenium oxide;
mixing the alkyl ammonium-layered ruthenium oxide with a solvent to obtain an exfoliated ruthenium oxide nanosheet;
conducting a surface doping to obtain the plurality of surface-doped ruthenium oxide nanosheets; and
applying a composition comprising the plurality of the surface-doped ruthenium oxide nanosheets on a surface of a substrate to form a first conductive layer; and
wherein the surface doping comprises adding the alkali metal- substituted layered ruthenium oxide, the proton exchanged layered ruthenium oxide, or the exfoliated ruthenium oxide nanosheet to an aqueous solution comprising a ruthenium halide, a ruthenium chalcogenide, an alkali metal halide, an ammonium halide, or a ruthenium-Group 15 element compound to form a mixture, and heating the mixture at a temperature of greater than or equal to about 100° C.,
wherein the plurality of ruthenium oxide nanosheets have an average lateral size of greater than or equal to about 0.1 micrometers and less than or equal to about 100 micrometers, and a thickness of less than or equal to about 3 nanometers.

15. The method of claim 14, further comprising applying a composition comprising conductive metal nanowires on a surface of the first conductive layer.

16. The method of claim 14, wherein the surface doping is conducted with the alkali metal substituted layered ruthenium oxide, and
wherein the method further comprises drying the plurality of ruthenium oxide nanosheets.

17. The method of claim 16, wherein the surface doping is conducted with the exfoliated ruthenium oxide nanosheet and
wherein the method further comprises dispersing a surface-doped product in a mixture of a solvent and a C1 to C20 alkyl ammonium compound to prepare a re-exfoliated ruthenium oxide nanosheet.

18. An electronic device comprising the electrical conductor of claim 1.

19. The electronic device of claim 18, wherein the electronic device is a flat panel display, a touch screen panel, a solar cell, an e-window, an electrochromic mirror, a heat mirror, a transparent transistor, or a flexible display.

* * * * *